J. G. BAILEY.
GROUND ROLLER AND CLOD CRUSHER.
APPLICATION FILED DEC. 13, 1911.
1,162,015. Patented Nov. 30, 1915.
2 SHEETS—SHEET 1.
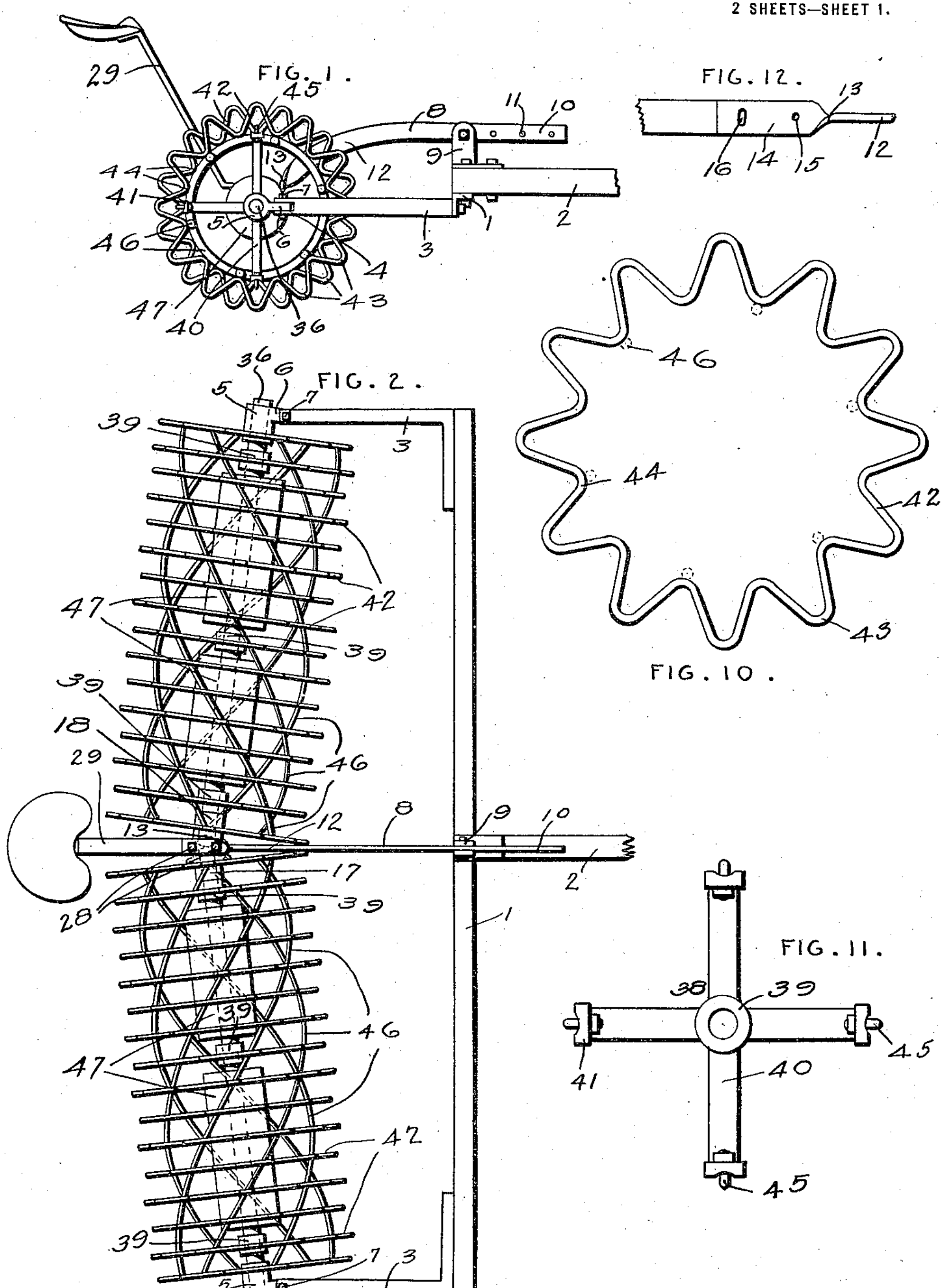
WITNESSES.
J. W. Naylor.
Lillian E. Tiemeyer
INVENTOR.
James G. Bailey
BY La Porte & Bean
ATTYS.

J. G. BAILEY.
GROUND ROLLER AND CLOD CRUSHER.
APPLICATION FILED DEC. 13, 1911.
1,162,015.
Patented Nov. 30, 1915.
2 SHEETS—SHEET 2.
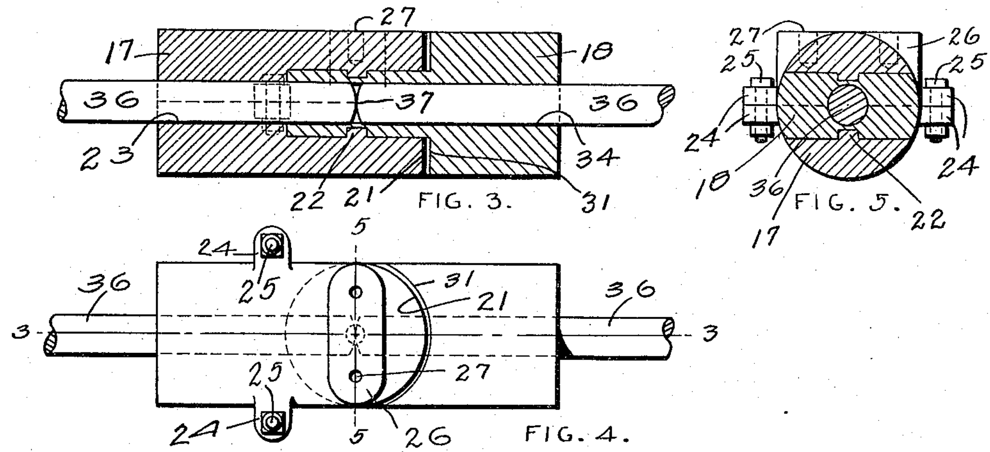
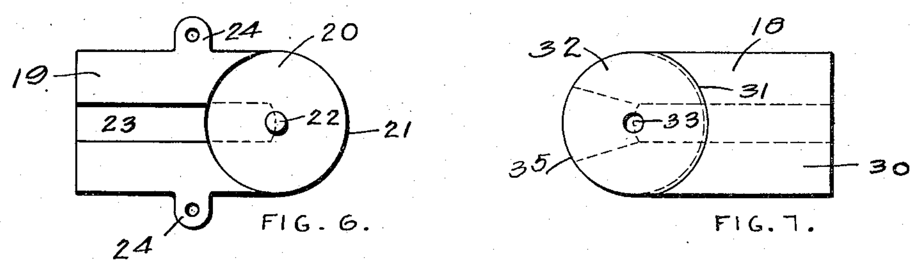
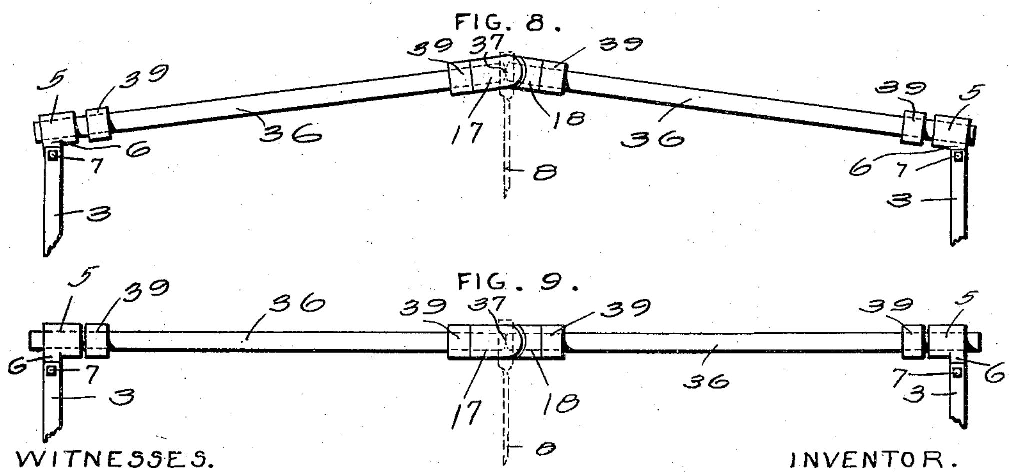
WITNESSES.
J. W. Naylor.
Lillian E. Siemeyer.
INVENTOR.
James G. Bailey
BY La Porte & Bean
ATTYS

UNITED STATES PATENT OFFICE.

JAMES G. BAILEY, OF DELAVAN, ILLINOIS.

GROUND-ROLLER AND CLOD-CRUSHER.

1,162,015. Specification of Letters Patent. Patented Nov. 30, 1915.

Application filed December 13, 1911. Serial No. 665,548.

*To all whom it may concern:*

Be it known that I, JAMES G. BAILEY, citizen of the United States, residing at Delavan, in the county of Tazewell and State of Illinois, have invented certain new and useful Improvements in Ground-Rollers and Clod-Crushers, of which the following is a specification.

My invention relates to improvements in ground rollers and clod crushers.

The principal object of my invention is the provision of a simple and economical ground roller and clod crusher which is cheap to manufacture, efficient in operation and which may be readily and cheaply shipped and transported from place to place.

A further object of my invention is the provision of a device wherein the ground engaging projections are in the form of open loops, so that the clods and earth will be pulverized and at the same time none of the earth will be retained in or on the device but will drop back as a loose mulch on the surface of the soil.

A further object of my invention is the provision of a roller whereby the ground and clods may be thoroughly pulverized, the effective weight of the roller being adjustable so as to provide a proper working of the soil.

To the accomplishment of the foregoing and such other objects as may hereinafter appear, my invention consists in the construction, arrangement and combination of parts hereinafter described and then sought to be defined in the appended claims, reference being had to the accompanying drawings forming a part hereof and which illustrate a preferred embodiment of my invention, it being understood however, that various changes may be made in the construction and arrangement of parts and details within the scope of the claims without digressing from my inventive idea which is defined therein.

In the drawings, Figure 1 is an end view of my improved roller and clod crusher, the two sections thereof being shown in alinement. Fig. 2 is a plan view of my device with the two sections arranged at an inclination relative to each other. Fig. 3 is a vertical section of the central pivoting coupling between the two shafts of the sections, taken substantially on the line 3—3 of Fig. 4. Fig. 4 is a plan view of the center castings or pivoting coupling. Fig. 5 is a vertical section taken substantially on line 5—5 of Fig. 4. Fig. 6 is a plan view of a section of one of the members forming the central pivoting coupling. Figs. 8 and 9 are diagrammatic views illustrating different positions of the axles or shafts of the sections of my improved device. Fig. 10 is a side elevation of one of the crushing or pulverizing rings of my device. Fig. 11 is a side elevation of one of the supporting members or frames, and Fig. 12 is a plan view of a detail.

Referring now to the embodiment of my invention illustrated in the drawings, the numeral 1 indicates the horizontal frame support which is of angle iron and has the tongue 2 connected therewith. Connected to the ends of the horizontal frame support are the arms 3 which are bifurcated, at their rear extremities as at 4. A bearing sleeve 5 is provided with a lug or extension 6, which is pivoted in said bifurcation 4 by means of the bolt or other fastening means 7, it being understood that this construction is duplicated on both sides of the device.

The connecting bar 8, is pivotally mounted on tongue 2 by means of bracket 9. This bar 8 has the drawbar portion 10 which is provided with holes or apertures 11. It is also provided with the connecting portion 12 which is bent at its rear end, as at 13, to provide a horizontal extremital portion 14, in which is formed the holes or apertures 15 and 16, the latter being elongated, as shown, for purpose to be hereinafter described. This connecting bar is attached to the central pivoting coupling in which are mounted the shafts to be hereinafter described. This central shaft coupling comprises two members 17 and 18, the member 17 being formed in sections 19 while the member 18 is integral and is held between the sections 19 of the member 17. Each section 19 of the member 17 is provided with a circular bearing portion 20 terminating in an arc-shaped extremity 21 and having the lug or pin 22 centrally located thereon. Each section 19 is grooved as at 23 so as to provide a circular bore to receive the shaft when the sections are assembled. Lugs 24 are provided on each section through which the fastening means 25 passes for holding the sections together. On the upper section 19 of the member 17, is provided the raised bearing surface or extension 26, which has the apertures 27 to receive the bolts or other fastening means 28 for holding the end of the connecting bar thereon. These bolts or fastening means 28, also secure the seat-post 29 to said bearing surface or extension 26. The member 18 of the central pivoting coupling has the body portion 30 terminating in the arc-shaped abutments or shoulders 31 which correspond in configuration to the arc-shaped extremities 21 of the sections 19 of the member 17. Projecting from the body portion 30 is the extension 32, which has flattened upper and lower horizontal surfaces which bear on the bearing surfaces 20 of the sections 19 of the member 17, recesses 33 being provided therein to receive the lug or pin 22. The member 18 is centrally bored, as at 34, to receive the shaft and this bore is flared as at 35 to provide or permit relative movement between the two coupling members forming the central pivoting coupling and between the shafts which are journaled therein. These shafts which are indicated by numeral 36, are slidingly held in the bearing sleeves 5 and in the members 17 and 18 of the central pivoting coupling, their inner extremities bearing against each other, as at 37. On each of these shafts 36 is mounted one section of my improved roller and clod crusher in which my invention particularly resides, as well as in the manner of mounting the same.

Near each extremity of each shaft 36 and also intermediate its ends are positioned the supporting members 38 which comprises the sleeves or hubs 39 which are secured to the shafts by means of keys or other suitable fastenings. Extending from the hub 39 on each supporting member are the supporting arms 40 which are radially arranged as shown and which have seats 41 provided on their extremities for parts of the device to be hereinafter described. These supporting members 38, are provided to hold and support the rings or members 42 which comprise each section of my device and to which attention is now to be directed with particularity. These crushing or pulverizing rings 42, one of which is shown in detail in Fig. 10, are formed preferably of steel rods of suitable thickness. These rods are corrugated or bent so as to provide a series of loops 43 which form clod crushing or ground engaging projections. It is to be noted that these ground or clod engaging projections 43 are of open loop formation and the portions of the rod forming the same converge toward the outer extremity thereof, which provides the pulverizing projections. This construction may further be described by stating that these projections 43 are connected by the inwardly extending loops 44 which are formed by portions of the rod converging toward the interior of the ring.

It will be understood from this description that each ring is formed on its periphery with a series of open ground engaging or pulverizing projections. A series of these rings 42 is mounted on each shaft 36 to form one section of my improved device. The rings are so arranged relative to each other that the loops 43 and 44 thereof alternate or are in staggered relation to each other. This provides a more efficient and thorough action of the device on the soil. Each ring 42 which is next to the end rings of each section of my device is secured to the supporting members 38 by means of the yoke or other fastening means 45 which engages one of the inwardly extending loops 44 and holds it on the seat 41. The intermediate ring of each section of the device is held in the same manner on the intermediate supporting member 38. Means are also provided for assembling and holding the rings 42 in a fixed position relative to each other, the means being shown here in the spirally arranged rods 46, which are secured to the inner end of loops 44 by means of welding or in any other suitable manner. It is to be noted that the rods are only used in connection with every other loop 44 so that in a device in which there are twelve loops to each ring, there will be six rods. However, this number of loops and the number and arrangement of rods 46 may be varied according to the necessity of circumstance.

It is necessary to provide some means for producing a sufficient weight in this device to allow it to operate thoroughly and efficiently and I disclose, as one means, the reinforced concrete rolls or sleeves 47 which are placed on the shafts 36 inside of the rings 42. This is a very simple way of providing the necessary weight and by having rolls of various sizes and various materials, the effective weight of the device may be varied according to working conditions.

It is believed that the operation and advantages of my improved roller and clod crusher are evident from the above description taken in connection with the drawings. The inclination of the two sections of the device relative to each other may be changed as desired by changing the point of pivotal connection between the bracket 9 and the connecting bar 8. By changing the position of this pivot, the inclination of the two sections of the device relative to the line of draft is also changed as desired, the sliding fit of the shafts 36 in the bearing sleeves 5 allowing sufficient movement at the outer extremity of the shafts, and the sliding fit of the inner extremities of the shaft in the central pivoting coupling allowing the requisite movement at that end. The construction of the coupling allows the movement of the inner ends of the shaft relative to each other, yet, by means of the pins 22 and recesses 33 holds the members forming the coupling together. The elongated aperture 16 in the end of the connecting bar allows relative movement between the connecting bar and the members 17 of the center coupling.

By utilizing rings of the peculiar construction set forth, numerous advantages are attained over prior rollers and clod crushers. It is to be noted that there is no extended bearing surface on the ground and this will allow more penetration by the pulverizing projections. Then by having these projections of open loop formation, the dirt cannot be retained in or on the roller but will drop back as a loose mulch on the ground, which is a very advantageous consideration.

Another important advantage of this structure is the lightness of the roller construction, allowing it to be handled with facility and shipped at little expense compared to prior rollers. Weight may be applied and varied as indicated according to the convenience and judgment of the operator and the simple means shown for adding weight may be utilized and made by the owner of the device. Another consideration on this same line is the fact that the seat is positioned to the rear of the roller so that the operator's weight is utilized to force the roller into the ground, the seat post and connecting parts operating as a lever arm.

The device is simple and easy to manufacture, readily assembled and has no complicated parts to get out of order, which may not readily be repaired. It is efficient and thorough in operation and may be made and sold at a comparatively cheap price.

What I claim is:—

1. In a device of the character described, a roller composed of rings of open loop formation, said rings being spaced apart so as to have a crushing or pulverizing action on the earth.

2. In a device of the character described, a roller composed of rings corrugated or bent so as to form open loops, said rings being spaced apart so as to have a crushing or pulverizing action on the earth.

3. In a device of the character described, a roller having a plurality of series of ground engaging projections in the form of open loops, the sides of the loops extending in the direction of the travel of the roller, said series of loops being spaced apart so as to have a crushing or pulverizing action on the earth.

4. In a device of the character described, a roller composed of rings of open loop formation, the sides of the loops extending in the direction of the travel of the roller, said rings being spaced apart so as to have a crushing or pulverizing action on the earth.

5. In a device of the character described, a roller having a plurality of series of ground engaging projections in the form of open loops, said projections being arranged in staggered relation, said series of loops being spaced apart so as to have a crushing or pulverizing action on the earth.

6. In a device of the character described, a roller having a plurality of series of ground engaging projections in the form of open loops, said projections being arranged in staggered relation, and the sides of the loops extending in the direction of travel of the roller, said series of loops being spaced apart so as to have a crushing or pulverizing action on the earth.

7. In a device of the character described, a roller composed of rings of open loop formation, and rods holding said rings together.

8. In a device of the character described, a roller composed of rings, said rings having outwardly extending loops and inwardly extending loops, said rings being spaced apart so as to have a crushing or pulverizing action on the earth.

9. In a device of the character described, a roller composed of rings, said rings having outwardly extending loops and inwardly extending loops, said rings being spaced apart so as to have a crushing or pulverizing action on the earth, and means holding said rings together.

10. In a device of the character described, a roller composed of rings, said rings having outwardly extending loops and inwardly extending loops, said rings being spaced apart so as to have a crushing or pulverizing action on the earth, and means holding said rings together secured to certain of said inwardly extending loops.

11. In a device of the character described, a roller composed of rings, said rings having outwardly extending loops and inwardly extending loops, and means holding said rings together, said means comprising spirally arranged rods.

12. In a device of the character described, a roller composed of rings, said rings having outwardly extending loops and inwardly extending loops, and means holding said rings together, said means comprising spirally arranged rods secured to certain of said inwardly extending loops.

13. In a device of the character described, a shaft, supporting members secured to said shaft adjacent its ends and also intermediate its ends, said supporting members having radially extending arms, a plurality of rolling and crushing rings adapted to have a crushing or pulverizing action on the earth, means connecting said rings together, certain of said rings being connected to said arms on said supporting members.

14. In a device of the character described, a frame, a shaft mounted therein, supporting members on said shaft having supporting arms, a plurality of members having projections in the form of open loops, said members being spaced apart longitudinally of said shaft and adapted to have a crushing or pulverizing action on the earth, and means to hold said members on said supporting arm.

15. In a device of the character described, a frame, a shaft mounted therein, supporting members on said shaft having supporting arms, a plurality of members having projections in the form of open loops, means connecting said members, and certain of said members being connected to said supporting arms.

16. In a device of the character described, a frame, a shaft mounted therein, supporting members located on said shaft and spaced apart having radially arranged supporting arms, a plurality of rolling or crushing members having outwardly extending loops, and inwardly extending loops, spirally arranged rods connecting said members together, certain of said members having certain of their inwardly extending loops connected to said supporting arms.

In testimony whereof I affix my signature, in presence of two witnesses.

JAMES G. BAILEY.

Witnesses:
Albert Brakar,
S. H. Lawton.

Copies of this patent may be obtained for five cents each, by addressing the "Commissioner of Patents, Washington, D. C."